Sept. 23, 1947. H. L. LAUVER ET AL 2,427,863
AUXILIARY ENGINE CONTROL SYSTEM
Filed Jan. 23, 1942 3 Sheets-Sheet 2
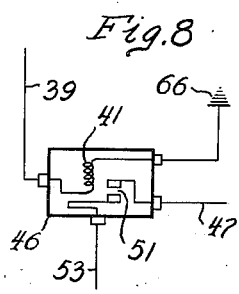
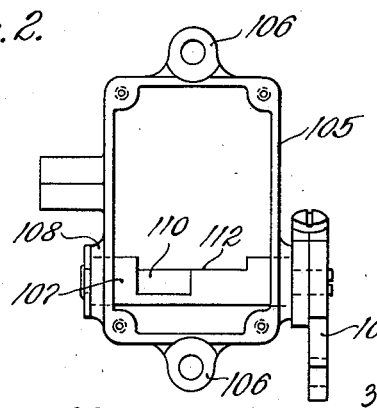
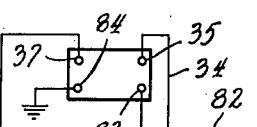
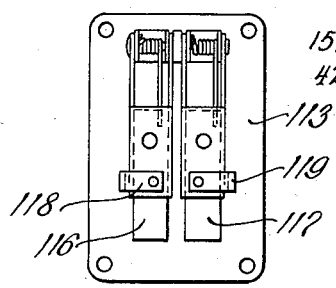
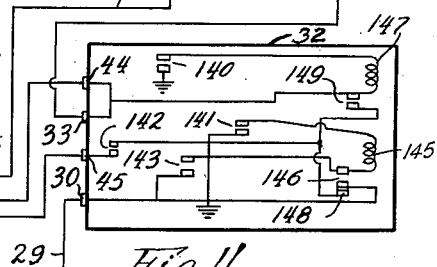
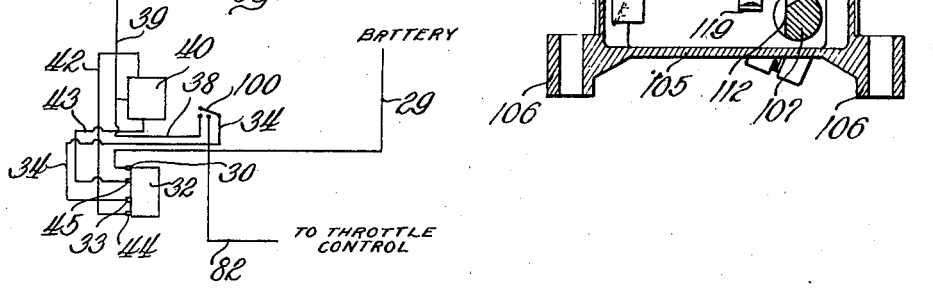
INVENTORS
DONALD D. ORMSBY – HERBERT L. LAUVER
BY Walter E. Schirmer
ATTORNEY

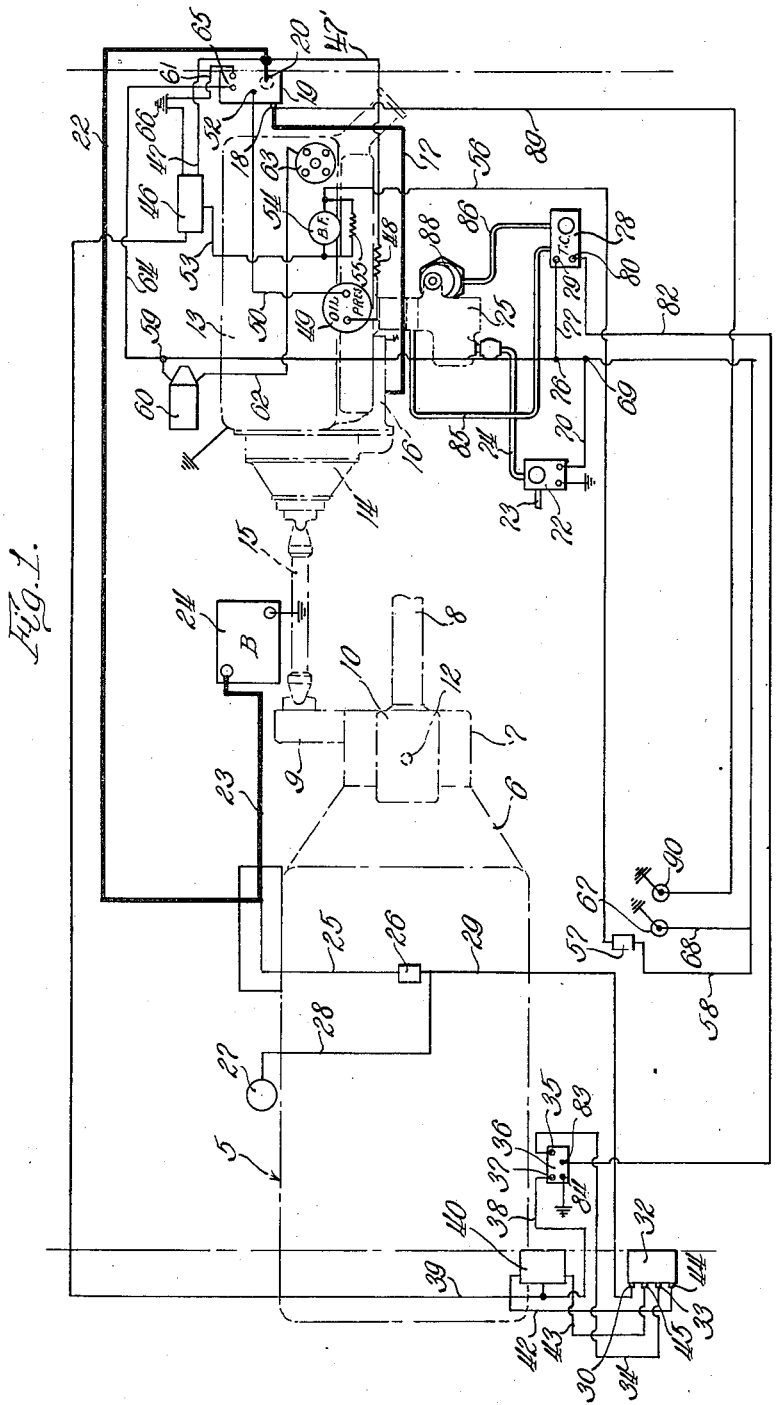

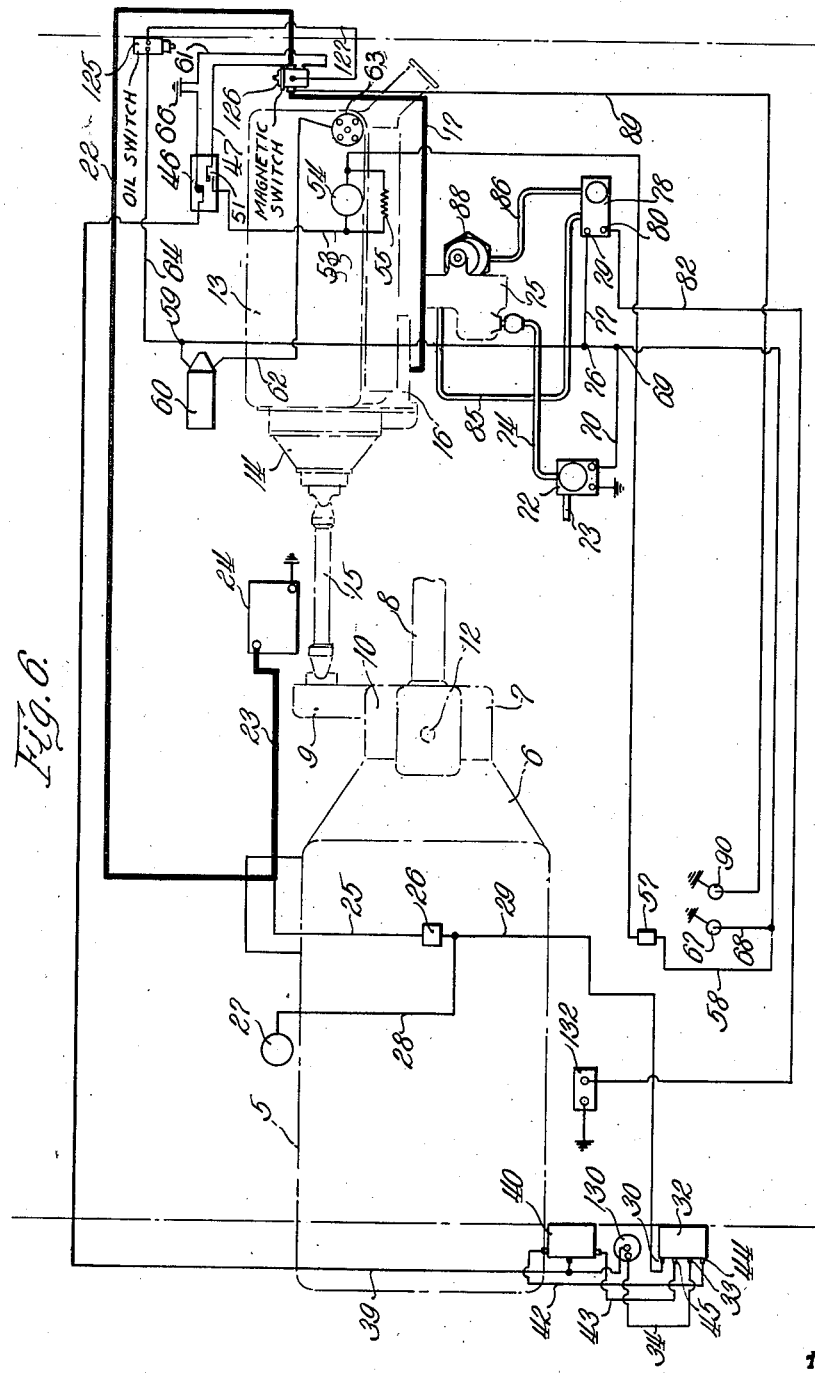

Patented Sept. 23, 1947

2,427,863

UNITED STATES PATENT OFFICE 2,427,863

AUXILIARY ENGINE CONTROL SYSTEM

Herbert L. Lauver and Donald D. Ormsby, Buchanan, Mich., assignors to Clark Equipment Company, Buchanan, Mich., a corporation of Michigan Application January 23, 1942, Serial No. 427,908

9 Claims. (Cl. 180—54)

This invention relates to control systems for auxiliary or booster engines in motor vehicles, such as trucks, busses or the like, and is more particularly concerned with the provision of means whereby the operator can, at will, produce starting of the auxiliary engine within certain speed ranges in order to utilize the torque of the booster engine to supplement the torque of the main engine in carrying the vehicle up hills and in acceleration and the like.

The present invention relates to and is a modification of the invention disclosed in the copending application, Serial No. 354,322, filed August 26, 1940, of Donald D. Ormsby, now Patent No. 2,419,912 issued April 29, 1947, and relates more particularly to a simplification of the control system so that it can be manually controlled by the operator within certain speed ranges.

Primarily, the present invention eliminates the manifold pressure responsive switch disclosed in the previous application, and substitutes therefor a switch which may be manually actuated by the operator to close the ignition circuit and starting circuit of the booster engine within a predetermined speed range.

One object of the present invention is to facilitate the actuation of the control system by placing the control switch beneath the accelerator pedal whereby the operator, when proceeding within a certain speed range under full load, may produce operation of the supplemental engine by overshooting the accelerator position, there being a lost motion connection allowing the accelerator pedal to move beyond full open throttle position in order that the switch may be manually closed by this further movement to initiate operation of the booster engine. Once the booster engine has been started, however, the foot control switch is rendered inoperative so far as further control is concerned, and the booster engine will automatically cut out whenever the speed of the vehicle increases beyond a predetermined maximum or decreases below a predetermined minimum.

Still another feature of the present invention is the provision of a control relay which controls the operation of the starter circuit, this relay being actuated upon closing of the speed governor contacts and closing of the pedal operated switch. However, a distinct advantage is obtained in the present construction in that the control circuit does not handle the high current required in the starting circuit and can be operated on a relatively low current whereby the danger of arcing of the contacts within the various control mechanisms is substantially eliminated.

Still another feature of the present invention is the provision of a control system similar to that described in the previous application in which the wiring harness is substantially the same, but wherein we have eliminated the manifold vacuum switch, and have substituted therefor a pedal control switch, which is under the direct control of the operator for closing the control circuit providing the governor is operating within the proper speed range, which in turn closes the circuit to the starting elements of the booster engine and at the same time energizes the booster engine ignition system.

The present invention also contemplates a control system in which the booster engine can be employed for acceleration through the various speed ratios of the transmission of the vehicle utilizing the additional torque of the booster engine for such acceleration, and thereby giving to the vehicle increased accelerating power. In this connection, the foot accelerator which controls the speed of the main engine is so arranged as to actuate a suitable control switch, which in turn controls the throttle of the booster engine so that the booster engine throttle returns to idling position whenever the main engine throttle idles during shifting of gears or the like, and immediately upon opening of the main engine throttle, the booster engine throttle starts to open and moves to full open position so that all available power of the booster engine can be delivered to the driving system. Precautions are taken to insure that the torque of the booster engine will not be available in the lowest or creeper gear ratio to prevent over-stressing of the driving mechanism. This is controlled by the governor relay, which does not allow starting of the booster engine unless the speed of the vehicle is above that at which creeper gear would be employed. Similarly, in decelerating under full load, the booster engine is cut out when the speed approximates that at which it is necessary to shift into creeper gear. The speed governor relay is also arranged so that when the vehicle is travelling at a speed greater than the desired maximum at which the booster engine is to be employed, the governor will deenergize the booster ignition circuit so that irrespective of the foot throttle control position, the booster engine cannot be started. However, upon encountering a grade, the vehicle of course begins to decelerate. A certain differential action is provided so that the deceleration of the vehicle must proceed to a point below the predetermined speed at which the booster is cut out before the operator will be able to cut in the booster to supplement the torque of the main engine. This differential can be set as desired, but preferably is set at approximately ten miles per hour below the maximum cut out speed.

In conjunction with the accelerator control, there is provided a switch mechanism connected to the accelerator linkage which, when the accelerator is approximately in a two-thirds open position, actuates one set of contacts for controlling the actuation of the booster engine throttle to open this throttle if the booster engine ignition system is energized, and to close the booster engine throttle to idling position upon idling of the main engine during the shifting of gears. In addition, the accelerator switch has a second set of contacts which can be closed only when the foot throttle is in a 100% open position, and is then pressed downwardly beyond this position whereupon the control circuit will be energized if the vehicle is travelling within the desired speed range.

Other objects and advantages of the present invention will appear more fully from the following detailed description, which, taken in conjunction with the accompanying drawings, will disclose to those skilled in the art the particular construction and operation of a preferred form of the present invention.

In the drawings:

Figure 1 is a circuit diagram showing the control circuits for the system;

Figure 2 is a plan view of the accelerator switch with the cover plate removed;

Figure 3 is a bottom plan view of the cover plate for the accelerator switch;

Figure 4 is a sectional view through the accelerator switch;

Figure 5 illustrates an optional control circuit allowing manual control by the operator independently of the foot accelerator;

Figure 6 is a modification of the control circuit shown in Figure 1;

Figure 7 is a diagrammatic illustration of the governor control; and

Figure 8 is a detailed diagrammatic view of the circuit control relay shown in Figures 1 and 6.

Considering now in detail Figure 1 of the drawings, there is indicated therein a main engine 5 having the clutch housing 6 and the transmission 7 from which extends the propeller shaft 8 leading to the rear driving axle of the vehicle. The transmission 7 is provided with a laterally extending housing 9 secured thereto, and is provided on its top with the shift rail control box 10 having the gear shift lever 12 thereon for controlling the shifting of gears within the transmission 7. A booster engine 13, which may be the same or of smaller horsepower than the main engine 5, is indicated at 13, and is disposed rearwardly of and laterally offset from the main engine 5 adjacent one of the side rails of the vehicle. The booster engine 13 is reversed in position with its front end directed to the rear of the vehicle. The engine is provided with a clutch housing 14 in which is mounted an overrunning clutch of conventional type, which is adapted to connect the booster engine when it comes up to full speed with a lay shaft 15 extending into the laterally offset housing 9. The housing 9 contains a gear secured on the shaft 15, an idler gear meshing therewith, and also meshing with a gear on the countershaft of the transmission 7. It will be apparent that whenever the main engine 5 is in operation the shaft 15 will be rotated at a speed corresponding to the reduction effected in the countershaft of the transmission. When the booster engine 13 starts and comes up to full speed, the overrunning clutch is engaged due to the relative rotation of the booster engine crankshaft and the shaft 15, and the booster engine thereupon adds its torque to that of the main engine by driving the shaft 15, and consequently driving the countershaft.

Suitable arrangements are provided for keeping the booster engine at the desired operating temperature at all times, this being shown in detail of the copending application of Donald D. Ormsby, Serial No. 353,818, filed August 23, 1940, now Patent No. 2,290,703, issued July 21, 1942.

Considering now in detail the control system which controls the operation of the booster engine, there is provided on the booster engine a starting motor 16 which cranks the flywheel of the booster engine in a conventional manner. The starting motor 16 is connected through the conductor 17 to a terminal 18 of a starting box 19, which starting box may be of the type known as "Startix," which has been in general use for some time. Another terminal of the Startix 19, indicated at 20, has connected thereto the conductor 22 which leads back through the conductor 23 to the battery 24, whereby battery current is led through the conductors 23 and 22 to the Startix, and upon energization of the starting coil in the Startix, this circuit is closed to the terminal 18 and thence through the conductor 17 to the starting motor 16, thereby energizing the same.

The control circuit for the Startix includes a conductor 25 connected through conductor 23 to the battery of the vehicle and having the main engine ignition switch 26, whereby this battery current is led to the ignition coil 27 of the main engine through conductor 28. Also, when the main engine ignition switch is closed, current is led through conductor 29 to one terminal 30 of a governor relay 32, which relay is similar to that disclosed and described in the copending application of Donald D. Ormsby, Serial No. 256,947, filed February 17, 1939, now Patent No. 2,419,911, issued April 29, 1947.

The control mechanism shown in the governor control 32 is more clearly disclosed in Figure 7, together with the mechanism embodied in the control relay 40.

The governor mechanism comprises four sets of contacts 140, 141, 142 and 143, which are adapted to be closed mechanically through a suitable governor mechanism at speeds of 9, 20, 10 and 35 miles per hour, respectively, it being understood, of course, that these limits may be varied as desired.

Closing of contacts 141 and 143 results in energization of relay 145, which closes the circuit between contacts 146 and opens the circuit between the armature of this relay and contact 148. This closing of contacts 146 and opening of contact 148 cuts out the circuit from battery through conductor 29 to either contacts 140 or 142, thus opening the circuit to conductors 42 and 43, thereby opening the circuit to control relay 40. Since contacts 143 are closed only when the vehicle is travelling in excess of 35 miles per hour, this operates as a maximum speed control for preventing operation of the booster engine.

In a case where the vehicle is travelling between 11 and 19 miles per hour, contacts 140 and 142 are closed. Contact 148 in this situation is engaged with the armature of relay 145, and consequently battery current is supplied from terminal 30 through contact 148 and through contacts 142 to terminal 45. Current flows from terminal 45 through conductor 43 to one of a pair of contacts 156 in control relay 40.

Under such conditions, due to closing of contacts 140, relay 147 is energized, whereby battery current flows through contacts 149 to terminal 33, and thence through conductor 34 to terminal 35 of the accelerator switch 36. When the circuit through this switch is closed, terminal 37 is connected to terminal 35, and current flows out through conductor 38 to conductor 39. Immediately upon energization of conductor 39, however, a circuit is established through relay 158 of control relay 40, closing contacts 156 and thus by-passing switch 36, since relay 158 is grounded through conductor 42, terminal 44 and contacts 140. Thus the circuit is maintained closed to conductor 39 independently of the foot controlled switch 36, and having once been established by this switch 36, is opened only in accordance with the speed of the vehicle as determined by the governor control of mechanism 32. If a speed in excess of 35 miles per hour is reached, contacts 143 close, energizing relay 145 and thus opening the battery circuit to the control relay and to conductor 39. If the speed drops below 9 miles per hour, contacts 140 and 142 open, deenergizing relay 147 and interrupting battery current to relay 40, conductor 39 and contact 156.

If a speed between 20 and 35 miles per hour is attained, the booster engine continues in operation, even though contacts 141 close, since contacts 143 remain open, and relay 145 remains energized.

Whenever the vehicle speed is between 21 and 34 miles per hour, all contacts in mechanism 32 are closed with the exception of contacts 143. In such case the booster engine will operate only if the accelerator switch 36 is maintained depressed beyond the limiting position, in accordance with the circuit outlined above. Thus the booster engine can be used for accelerating up to 35 miles per hour.

However, once relay 145 is energized, it will remain energized even though the speed drops below 35 miles per hour, opening contacts 143. This is due to current flow from terminal 30 through contact 148, relay 145 and contacts 141 to ground, holding the relay energized and preventing operation of the booster engine during deceleration down to 20 miles per hour, at which time contacts 141 open, deenergizing relay 145 and reconditioning the control mechanism for operation by the accelerator switch 36.

Considering now the operation of circuit control relay 46, shown in detail in Figure 8, this relay is interposed in the circuit between conductor 39 and the starting circuit for the booster engine. This is a standard type of relay manufactured by the Electric Auto-Lite Company and includes a coil 41 which is energized from conductor 39 and grounded as indicated at 66. This coil, when energized operates to close contacts 51, thereby closing the circuit from battery conductor 22 through conductor 47 to conductor 53.

From the battery conductor 22 there is also provided a connection through conductor 47' to an oil pressure switch 49, through resistance 48. The oil pressure switch 49 is of the normally open type so that no current flows from this switch through conductor 50 until such time as the oil pressure in the booster engine crank case reaches a predetermined amount.

The energization of conductor 53 through the closing of the circuit in relay 46 establishes a circuit from the battery through backfire switch 54 which has the resistance 55 in parallel therewith, and thence through the conductor 56 to the booster engine ignition switch 57. The switch 57 is provided solely for the purpose of optionally cutting out the booster engine at any time, since opening of this switch will open the circuit to the booster engine ignition, as will be described shortly. From the switch 57, current is led from conductor 58 to terminal 59 which forms one connection to the ignition coil 60 of the booster engine. From the high tension coil 60, current is led through conductor 62 to the distributor 63 of the booster engine. Also, from terminal 59, current is led through conductor 64 to another terminal 65 of the primary coil of the Startix 19 so that when this circuit has been established, the Startix will operate through conductor 17 to energize the starting motor. The oil pressure switch is then actuated due to starting of the booster engine which raises the oil pressure therein, and closes the circuit from battery through resistance 48, causing current flow through the oil pressure switch 49 into the secondary coil of the Startix at terminal 52, and thence through this coil and conductor 61 to ground at 66. This energizes the secondary coil, and as the cranking effort has initiated starting of the booster engine, the primary circuit through the Startix 19 is broken, deenergizing starting motor 16.

So long as the relay 46 receives current from conductor 39, therefore, the high tension coil 60 will remain energized to prevent deenergizing of the ignition circuit. Connected to the conductor 58 between the booster engine switch 57 and the coil 60 is a tell-tale light 67 receiving current through conductor 68, which, when energized, indicates that the booster engine ignition system is energized. Also, from terminal 69 on conductor 58, current is led through conductor 70 to a fuel check valve 72 which is electrically controlled to allow flow of fuel from pipe 73 into pipe 74 leading to the carburetor 75 of the booster engine. Also, on conductor 58 there is another terminal 76 which, through conductor 77, is connected to a throttle control valve 78, shown more in detail in Patent No. 2,419,912 referred to above. This throttle control valve includes a solenoid disposed between terminal 79 and terminal 80 thereon, the terminal 80 being connected through conductor 82 to one terminal 83 of the accelerator switch 36. The other terminal of this circuit indicated at 84 is connected to ground. When the throttle at the main engine is pressed to a two-thirds open position or further, the circuit is established from the ignition circuit of the booster engine through conductor 77, and terminals 79 and 80 to conductor 82, thereby energizing the solenoid in the throttle control element 78 opening the valve between the conduit 85 and the conduit 86. Opening of this valve allows manifold vacuum in the intake manifold of the booster engine to become effective upon a diaphragm operated member 88 which opens the throttle of the carburetor 75 when the valve in the control element 78 is open. This opens the booster engine throttle from idling position to full open position, whereupon the booster engine is brought up to speed, and through the overrunning clutch in housing 14 is connected to the power system. Whenever the accelerator pedal is released beyond its two-thirds open position, the circuit is broken between terminals 83 and 84, and consequently the solenoid between terminals 79 and 80 of control element 78 is de-energized, closing the valve between conduits 85 and 86, and opening conduit 86 to atmosphere. As a result, the member 88 is deenergized and a suitable spring returns the throttle valve in the carburetor 75 to idling position.

When the foot accelerator is depressed beyond the two-thirds point, the circuit is reestablished and the throttle of the booster engine is again moved to full open position.

In order to indicate to the operator of the vehicle that the starting circuit of the booster engine is energized and the booster engine is being cranked, we provide from terminal 18 of the Startix 19 a conductor 89 which leads to a telltale light 90 mounted adjacent the light 67. The tell-tale light 67 is preferably green to indicate to the driver that the booster ignition system is closed, while the tell-tale light 90 may be red to indicate that the cranking circuit is energized. Thus, upon energization of the booster engine control circuits through relay 46, both lights 67 and 90 will be energized as the booster engine fires and the cranking action starts. Due to the action in Startix 19, the light 90 will be extinguished when the circuit to terminal 18 of the Startix is de-energized, but light 67 will stay energized until such time as the booster engine is stopped. This provides a protective indicating system to apprize the operator of the vehicle as to the operations occurring at the booster engine.

It will be apparent that with this system the control circuit through conductor 39 carries only a very small current, and consequently the contacts in governor relay 32, in accelerator switch 36, and in the cut-out relay 40, can be correspondingly designed, reducing the cost of these elements and insuring a longer operating life therefor. The relay 46 merely controls the operation of the starting and ignition circuits at the booster engine, these circuits carrying the heavier current from the battery 24 through conductors 23 and 22 to the Startix and thence to the starting motor 16.

In order to understand more fully the details of operation occurring within the switch 36, which switch serves the double function of providing for foot controlled operation of the booster engine under certain speed conditions, and also provides for control of the booster engine throttle to allow idling of the booster during gear shifting, we have shown in Figures 2 to 4 the details of a switch which will perform these functions. It is perfectly obvious, however, that in place of using the foot accelerator and overshooting the full open position thereof to energize the circuit between terminals 35 and 37, this could be accomplished by a manually operable switch mounted on the instrument panel or on the gear shift lever, and manually controlled by the operator. Such a circuit is shown in Figure 5 in which corresponding reference numerals indicate similar parts. However, in Figure 5, we have shown only the details of the governor relay 32, the cut-out relay 40 and the manually controlled switch which takes the place of the switch 36. The switch is indicated at 100 and is adapted to close the circuit between conductor 34 and conductor 38 in the same manner that it would be closed by the accelerator pedal under the conditions previously described. The system is still fool-proof so far as any possibility of the operator using the booster engine for speeding or for use in creeper gear, which might overstress the driving parts, since the control circuit for starting the booster cannot be closed solely by the manually operated switch 100, but is also controlled by the relay 32 in such manner that closing of the switch 100 must be accomplished within a predetermined speed range in order to effect starting of the booster engine.

Referring now in detail to Figures 2 to 4, there is shown a die cast housing 105 having boss portions 106 for attachment to a suitable support. Extending transversely across the housing 105 is a shaft 107 journalled at one end in the boss 108, and carrying at its opposite end the crank arm 109. The arm 109 is attached by means of a split clamp portion to the projecting end of the shaft, and is adapted to be connected through suitable linkage to the accelerator pedal whereby operation of the accelerator pedal produces rotation of the shaft 107.

It will be noted that the shaft 107 is provided with circumferentially offset flatted portions 110 and 112 shown in detail in Figures 2 and 4.

A suitable insulating cover member 113 is adapted to be secured as by means of screws 114 over the open upper end of the housing 105. The cover plate 113 carries four contact terminals, indicated generally at 114 and 115, which contact terminals receive conductors leading thereto, as shown in Figure 1.

Mounted on the under surface of the plate 113 as by means of suitable rivets or the like are a pair of pivotally mounted contact arms 116 and 117, respectively. Suitably secured by the rivets which secure the terminals 115 to the plate are a pair of contacts 118 and 119, respectively, which are adapted to be engaged by the contact portions of the arms 116 and 117 for closing circuits between the respective terminals 114 and 115.

The contact arms 116 and 117 are normally spring pressed downwardly to produce engagement with the contacts 118 and 119, but are restrained from such engagement by the shaft 107, which, when in one position, has the full surface thereof upon which the arms 116 and 117 rest thereby spacing these arms from the associated contacts. Upon rotation of shaft 107, the arm 116 first engages the flatted surface 110 and drops down to close the contact between the arm and the contact 118. This, in effect, completes the circuit from the conductor 82 through terminals 83 and 84 to ground, thereby conditioning the throttle control mechanism for operation.

As has been previously described, the completion of this circuit thereby allows the throttle control mechanism to function conjointly with the throttle at the main engine after the booster engine has been started.

With the shaft 107 in this position, the booster engine, however, is not yet energized since the throttle control pedal at this time is only in a range of from two-thirds to full open position. However, upon further rotation of shaft 107 caused by over-shooting the full open position of the accelerator pedal, the flatted portion 112 of the shaft 107 moves into such position as to allow the arm 117 to drop downwardly to engage contact 119. This closes a circuit between the terminals 35 and 37 of the circuit shown in Figure 1, thereby completing a circuit between conductor 34 and conductor 38. If the speed range of the vehicle is such that the governor mechanism 32 has been actuated to impose current on conductor 34 from battery, the conductor 39 will be energized and, through the connections previously described, will actuate the booster engine.

Thus, it is apparent that with the switch mechanisms shown in Figures 2 to 4, the operation of the accelerator pedal at the main engine will control the starting of the booster engine, providing the speed range of the vehicle is within such limits that the governor mechanism allows the booster engine to be operated.

Considering now in detail Figure 6, which is a modification of the control system shown in Figure 1 and in which corresponding reference numerals have been retained for the corresponding parts, the particular feature of this control system which distinguishes it from that shown in Figure 1 is the elimination of the Startix mechanism, and also of the relocation of the oil pressure switch in the circuit.

In this particular arrangement the oil pressure switch 125 differs from the oil pressure switch 49 in that it is in normally closed position. Consequently, when conductor 39 is energized and relay 46 operates to close the circuit from the battery conductor 42 through conductor 47 to contacts 51 of relay 46 as shown in detail in Figure 8, and conductor 53 to the backfire switch 54, this current passes in the same manner as described in connection with Figure 1 up through conductor 64 through one terminal of the oil pressure switch 125 and thence through conductor 127 to the magnetic starting switch 126. This latter switch includes a coil having one end connected to conductor 127 and having the other end connected to conductor 61 to ground at 66. The magnetic switch is thus energized to start cranking the booster engine. However, as the booster engine starts, the oil pressure in the crank case of the booster engine 13 builds up to a point such that it opens the oil pressure switch 125 which interrupts current flow to conductor 127, thereby de-energizing the starting motor. Obviously, the oil pressure will not build up until such time as the booster engine has started, and consequently, the combination of the oil pressure switch which is normally closed and the magnetic switch 126 which is energized by the load and speed responsive means produces starting of the booster engine, and subsequent de-energization of the starting circuit when the booster engine has started.

In other respects, the circuit shown in Figure 6 is substantially the same as shown in Figure 1, and can be operated either from an accelerator control pedal as described in connection with Figure 1, or can be automatically controlled as by the use of a manifold vacuum responsive switch 130, shown in Figure 6, which closes the circuit between conductor 34 and conductor 39 upon predetermined reduction in the manifold vacuum corresponding to full loading on the engine 5. Under such circumstances it is desirable that the accelerator switch 132 be a simple limit switch which merely grounds the circuit through the throttle control mechanism 78 when the throttle control pedal is in a predetermined position.

It is to be understood that the oil pressure switch and magnetic switch combination of Figure 6 can be employed with the circuit of Figure 1 in place of the Startix 19 and oil pressure switch 49. Also, the throttle control mechanism for manually controlling the operation of the booster engine within a predetermined speed range as employed in the circuit shown in Figure 1 can also be applied to the circuit shown in Figure 6 if so desired.

It is therefore believed apparent that we have provided a novel type of control system which is especially adapted for use in booster engine systems of the type shown in the copending application of Donald D. Ormsby, Serial No. 354,322, now Patent No. 2,419,912 issued April 29, 1947, and simplifies such a control system for manual control by the operator within certain speed ranges, and also simplifies the control by the optional use of a simple magnetic switch and oil pressure switch in place of the Startix mechanism.

We are aware that various changes may be made in certain of the details herein shown and described, and therefore do not intend to be limited except as defined by the scope and spirit of the appended claims.

We claim:

1. In a vehicle having a main engine and a supplemental engine, a starting circuit for said supplemental engine, a foot operated throttle control for said main engine, a throttle for said supplemental engine, means operable to condition said circuit only within a predetermined speed range responsive to predetermined movement of said main engine throttle control pedal for energizing said starting circuit when said vehicle is within said speed range and including means for opening said supplemental engine throttle upon starting of said supplemental engine; said movement responsive means including a switch having two sets of contacts, and actuating means movable conjointly with said throttle control for sequentially closing said sets of contacts, closing of the first set of contacts energizing said supplemental engine throttle opening means, and closing of said second set of contacts energizing said supplemental engine starting circuit.

2. In a vehicle having a main engine and a supplemental engine, a starting circuit for said supplemental engine, a foot operated throttle control for said main engine, a throttle for said supplemental engine, means operable to condition said circuit only within a predetermined speed range responsive to predetermined movement of said main engine throttle control pedal for energizing said starting circuit when said vehicle is within said speed range and including means for opening said supplemental engine throttle upon starting of said supplemental engine; said movement responsive means including a switch having two sets of contacts, one set of contacts being adapted when closed to energize said supplemental engine throttle opening means, and the other set of contacts being adapted when closed to energize said supplemental engine starting circuit, and actuating means movable conjointly with said throttle control for sequentially closing said contacts, said actuating means being arranged to close one of said sets of contacts only after said throttle control pedal is moved past full open position.

3. A vehicle having a main engine, a throttle and accelerator pedal therefor, a supplemental engine having a starting circuit and a throttle, a control circuit for said starting circuit having a speed responsive switch, an accelerator pedal controlled switch in series, said speed responsive switch being closed only within a predetermined speed range of said vehicle, said pedal controlled switch being closed only upon movement of said pedal beyond full open position, whereby closing of both switches energizes said starting circuit, an ignition circuit for said supplemental engine energized simultaneously with said starting circuit and holding means in said control circuit for maintaining said ignition circuit energized regardless of return of said pedal into normal operating position, said ignition circuit being deenergized solely in accordance with opening of said speed responsive switch.

4. In combination, in a vehicle having a primary engine including an accelerator pedal, a supplemental engine normally at rest, a starting circuit and an ignition circuit for said supplemental engine, a control relay for said circuits, means for energizing said control relay including an accelerator pedal operated switch and a speed responsive switch in series, said last-named switch preventing actuation of said relay by said pedal operated switch except within a predetermined speed range of said vehicle, pressure responsive means for deenergizing said starting circuit when said supplemnetal engine starts, and means preventing deenergization of said ignition circuit except upon opening of said speed responsive switch.

5. The combination of claim 4 including means at said supplemental engine controlled by said pedal operated switch only when said supplemental engine is running for moving the throttle of said supplemental engine to full open position when the accelerator pedal of said primary engine is depressed beyond a predetermined point, and for returning the throttle at said supplemental engine to idling position whenever said primary engine accelerator pedal is not depressed beyond said predetermined point.

6. In a vehicle having a main engine and a supplemental engine, a starting circuit for said supplemental engine, a foot operated throttle control for said main engine, a throttle for said supplemental engine, means operable to condition said circuit only within a predetermined speed range responsive to predetermined movement of said main engine throttle control pedal for energizing said starting circuit when said vehicle is within said speed range, and circuit means operable by movement of said control pedal to a predetermined position to vary correspondingly thereby the position of said supplemental engine throttle.

7. In a vehicle having a main engine and a supplemental engine, a starting circuit for said supplemental engine, a foot operated throttle control for said main engine, a throttle for said supplemental engine, means operable to condition said circuit only within a predetermined speed range responsive to predetermined movement of said main engine throttle control pedal for energizing said starting circuit when said vehicle is within said speed range, circuit means operable by movement of said control pedal to a predetermined position to vary correspondingly thereby the position of said supplemental engine throttle, and means interlocking the last mentioned circuit means and said starting circuit whereby the former can be energized only on energization of the latter.

8. In a vehicle having a main engine and a supplemental engine, a starting circuit for said supplemental engine, an electrically controlled throttle for said supplemental engine, means operable to condition said circuit only within a predetermined speed range of said vehicle, manually operable switch means for completing the energization of said starting circuit within said speed range, and additional manually operable switch means for controlling the energization of said electrically controlled throttle.

9. In a vehicle having a main engine with a foot operated throttle control therefor and a supplemental engine, a starting circuit for said supplemental engine, an electrically controlled throttle for said supplemental engine, means operable to condition said circuit only within a predetermined speed range of said vehicle, manually operable switch means independent of said foot operated throttle control for completing the energization of said starting circuit within said speed range, additional manually operable switch means independent of said foot operated throttle control for controlling the energization of said electrically controlled throttle, and means interlocking the circuit including the last mentioned switch means and said starting circuit whereby said electrically controlled throttle is operable by the former circuit only when the latter circuit is energized.

HERBERT L. LAUVER.
DONALD D. ORMSBY.

REFERENCES CITED

The following references are of record in the file of this patent:

UNITED STATES PATENTS

| Number | Name | Date |
| --- | --- | --- |
| 2,419,811 | Beall | Apr. 29, 1947 |
| 1,908,088 | Warner | May 9, 1933 |
| 2,343,265 | Price | Mar. 7, 1944 |
| 1,339,513 | Ingersoll | May 11, 1920 |
| 1,768,530 | Short | June 24, 1930 |